United States Patent

[11] 3,618,809

| [72] | Inventor | Paul D. Martino<br>Mineral Wells, Tex. |
|---|---|---|
| [21] | Appl. No. | 854,991 |
| [22] | Filed | Sept. 3, 1969 |
| [45] | Patented | Nov. 9, 1971 |
| [73] | Assignee | Harsco Corporation<br>Harrisburg, Pa. |

[54] RELEASABLE FLUID SEAL FOR CONDUITS
1 Claim, 4 Drawing Figs.

[52] U.S. Cl............................................... 220/24.5,
215/54
[51] Int. Cl.................................................. B65d 39/12
[50] Field of Search........................................ 220/24.5;
215/54; 138/89

[56] References Cited
UNITED STATES PATENTS

| 2,168,734 | 8/1939 | Freeman | 215/52 |
| 2,493,452 | 1/1950 | Grigg | 220/24.5 X |
| 2,566,816 | 9/1951 | Work | 220/24.5 |
| 2,685,380 | 8/1954 | Moeller | 220/24.5 X |
| 2,746,632 | 5/1956 | Bramming | 215/52 |
| 2,773,619 | 12/1956 | Moeller | 220/24.5 |
| 3,365,093 | 1/1968 | Malenke | 220/24.5 |

FOREIGN PATENTS

| 108,857 | 7/1918 | Great Britain | 215/54 |
| 320,255 | 5/1957 | Switzerland | 215/52 |

*Primary Examiner*—Joseph R. Leclair
*Assistant Examiner*—James R. Garrett
*Attorney*—Cameron, Kerkam & Sutton

ABSTRACT: A releasable fluid seal for conduits or pipes has a cup of an elastomeric resilient material fitting into the pipe or conduit. A plate is embedded in the bottom of the cup and a bolt extends through the plate, is embedded in the bottom of the cup and extends through the open end of the cup. A second plate engages the periphery of the open end of the cup and also engages the end of the conduit or pipe or engages in the bell of the pipe. A wing nut on the bolt draws the two plates toward each other and bows the cup into fluidtight sealing engagement with the inner wall of the conduit or pipe.

PATENTED NOV 9 1971

3,618,809

INVENTOR

PAUL D. MARTINO

BY *Cameron, Kerkam & Sutton*

ATTORNEYS

RELEASABLE FLUID SEAL FOR CONDUITS

BACKGROUND OF THE INVENTION

This invention relates to releasable sealing means for conduits or pipes carrying fluid under pressure which seal is not subject to the corrosive action of the fluids and which may be used and reused, as desired, with ease of application and ease of removal. The surfaces of the seal in engagement with the inner surface of the conduit or pipe are such that the seal may be used and reused without imparing the sealing action thereof.

The invention may be classified as pipes and tubular conduits with closures and plugs. In this highly developed art, patents such as U.S. Pat. Nos. 1,541,756; 1,993,307; 2,667,139; 2,707,387; 3,291,156; 3,358,869; and 3,444,898 relate in general to the same subject matter.

SUMMARY OF THE INVENTION

A releasable sealing means in accordance with the invention comprises a cup-shaped closure member of resilient elastomeric material fitting into the internal bore of the pipe or conduit. A metal plate is embedded in the bottom of the cup and a bolt extends through the metal plate and is embedded in the bottom of the cup preventing leakage around the bolt. The bolt extends axially through the cup and through a second plate closing the open end of the cup. The second plate fits over the end of the pipe or conduit or fits in the bell of the pipe. A wingnut on the bolt draws the embedded plate toward the second plate and bows the cup into sealing engagement with the internal wall of the pipe or conduit. The external surface of the cup may be provided with circumferential integral fins for firm engagement of the cup with the interior surface of the conduit or pipe.

BRIEF DESCRIPTION OF THE DRAWING

In the accompanying drawing, in which like reference characters indicate like parts, a preferred embodiment of the present concept is shown and will be described hereinafter to illustrate the invention. In the drawing.

DESCRIPTION OF THE PREFERRED EMBODIMENT

Figure 1:
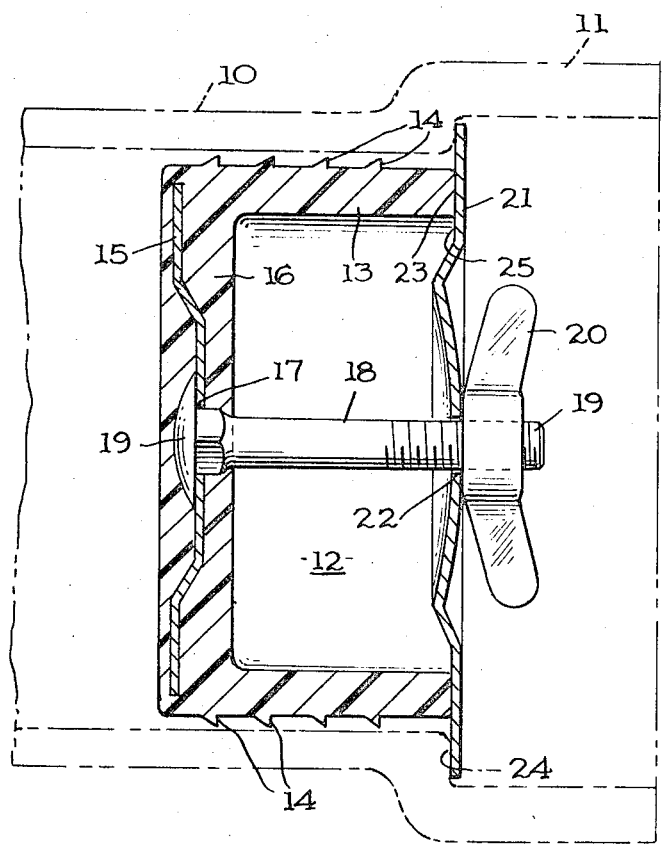
FIG. 1 is a cross-sectional view of a preferred embodiment of the seal of the present invention in place in the end of a pipe having a bell end.
Figure 2:
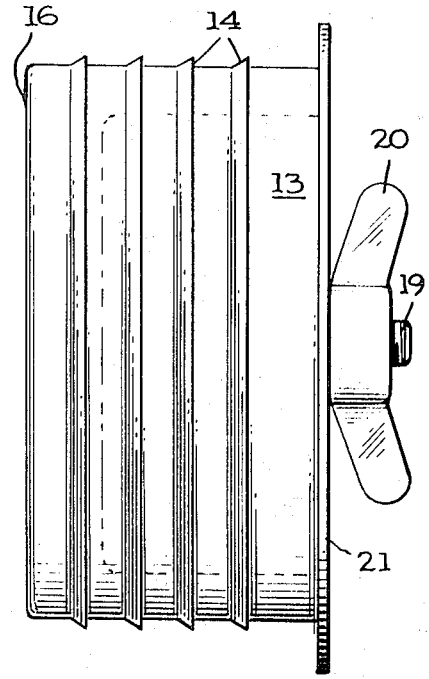
FIG. 2 is a side elevation of the seal of FIG. 1.
Figure 3:
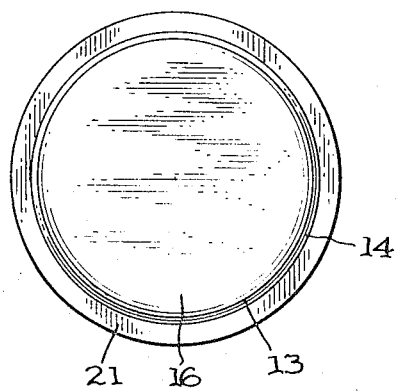
FIG. 3 is a view of the seal as seen from the left in FIGS. 1 and 2.
Figure 4:
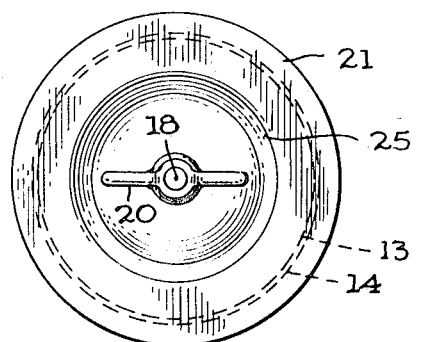
FIG. 4 is a view of the seal as seen from the right in FIGS. 1 and 2.

Referring now to the drawing, a pipe or conduit is generally indicated at 10 and is provided with a conventional bell end 11. The seal of the present invention is generally indicated at 12 and includes a cup-shaped member 13 of suitable resilient elastomeric material such as vinyl plastisol, polyurethane or rubber having a diameter such that the sealing member 12 fits within pipe 10. Cut-shaped member 13 may be provided with circumferential ribs 14 for engagement with the interior wall of the pipe or conduit 10. As best illustrated in FIGS. 1 and 2, the ribs 14 are shaped to provide a sawtooth configuration on the outer surface of cup shaped member 13. It should be readily apparent that the outwardly directed sharp edges of ribs 14 will tend to lock into indentations in the inner surface of the pipe 10. The portions of ribs 14 which are secured to the surface of cup-shaped member 13 provide reinforcement to the cantilever action of ribs 14 such that when wingnut 20 is tightened on bolt 18, as will be hereinafter more fully explained, lateral pressure tends to compress the ribs bending them toward plate 21. However, pressure in pipe 10, urging cup 13 out of the pipe 10, deforms ribs 14 in the opposite direction creating a wedging action to prevent expulsion of cup 13 from the pipe.

A dish-shaped plate 15 is embedded in the bottom 16 of cup 13 and is provided with central aperture 17 through which bolt 18 passes. Bolt 18 is provided with head 19 to engage plate 15 and head 19 is embedded in bottom 16 to prevent leakage of fluid around the bolt.

Bolt 18 is threaded at 19 to carry a suitable wingnut 20.

A second dish shaped plate 21 is provided with an aperture 22 through which bolt 18 passes. Plate 21 bears upon the circumferential top surface 23 of cup 13 and extends circumferentially from the outer surface of cup 13 to engage the offset 24 of bell 11.

When the seal 12 of the present concept is in place, as shown in FIG. 1, rotation of wingnut 20 draws plate 15 toward plate 21 and bows cup 13 and ribs 14 outwardly into sealing engagement with the interior surface of pipe or conduit 10.

Plate 15 is dish shaped to give adequate strength to prevent distortion of plate 15 when the stopper 12 is bowed into sealing engagement with the pipe or conduit. Plate 21 is also dish shaped and has a bend 25 in proximity to the inside of cup 13 to prevent surface 23 thereof from bending inwardly, thus forcing cup 13 to bow and form a convex shape when wingnut 20 is tightened.

Plate 21 may be cadmium plated to resist corrosion.

What I claim is:

1. A releasable seal for conduits comprising, a hollow cylindrical walled cup formed of elastomeric material, said cup having a circumferential top surface and a solid continuous bottom, said cup further having a substantially uniform outside diameter; at least one sawtooth shaped rib extending circumferentially about the outer surface of the said cup; a first rigid plate embedded in said bottom, said plate having a diameter which is greater than the inside diameter of the cup but less than the outside diameter thereof; an elongated threaded member disposed in axial concentric relation to and extending through said cup having an end secured to the rigid plate and embedded in the bottom of the cup; a second plate having a central dished portion extending outwardly of the cup and a planar annular rim portion positioned to bear upon the circumferential top surface of the cup and extending laterally outwardly therefrom engaging the end of the conduit preventing flow of elastomeric material between said second plate and the end of the conduit; the said dished portion having a wall extending thereabout into the cup adjacent the inner surface thereof in position to engage and limit movement of the edge of the cup inwardly when expanded, the threaded member extending centrally through the dished portion; and threaded means on said threaded member engaging the outer side of the dished portion, whereby when said threaded means is rotated said embedded plate is drawn toward said second dished plate and said cup is bowed outwardly into sealing engagement with the conduit.

* * * * *